(12) United States Patent
Cash

(10) Patent No.: US 7,325,562 B2
(45) Date of Patent: Feb. 5, 2008

(54) HEATED SEAL AIR FOR VALVE AND REGENERATIVE THERMAL OXIDIZER CONTAINING SAME

(75) Inventor: James T. Cash, Hackettstown, NJ (US)

(73) Assignee: Meggec Systems, Inc., DePere, WI (US)

( * ) Notice: Subject to any disclaimer, the term of this patent is extended or adjusted under 35 U.S.C. 154(b) by 506 days.

(21) Appl. No.: 10/139,927

(22) Filed: May 7, 2002

(65) Prior Publication Data

US 2005/0115696 A1    Jun. 2, 2005

(51) Int. Cl.
*F27D 17/00* (2006.01)
(52) U.S. Cl. .................. 137/311; 165/9; 277/434
(58) Field of Classification Search ......... 137/340, 137/311, 625.43; 422/175, 173, 171; 432/180, 432/179; 165/7, 9; 277/434
See application file for complete search history.

(56) References Cited

U.S. PATENT DOCUMENTS

| | | | | |
|---|---|---|---|---|
| 2,219,994 A | 10/1940 | Jung | .................. | 60/41 |
| 2,898,202 A | 8/1959 | Houdry et al. | .................. | 23/288 |
| 2,946,651 A | 7/1960 | Houdry | .................. | 23/2 |
| 3,368,611 A * | 2/1968 | Bracken, Jr. et al. | .................. | 165/9 |
| 3,664,413 A | 5/1972 | Bo | .................. | 165/4 |
| 3,799,241 A | 3/1974 | Schluter et al. | .................. | 165/4 |
| 4,280,416 A | 7/1981 | Edgerton | .................. | 110/254 |
| 4,384,566 A * | 5/1983 | Smith | .................. | 126/513 |
| 4,542,782 A | 9/1985 | Berner | .................. | 165/9 |
| 4,676,744 A | 6/1987 | Wray et al. | .................. | 432/181 |
| 4,770,857 A | 9/1988 | Ludwig | .................. | 422/111 |
| 4,834,962 A | 5/1989 | Ludwig | .................. | 423/351 |
| 5,016,547 A | 5/1991 | Thomason | .................. | 110/211 |
| 5,101,741 A * | 4/1992 | Gross et al. | .................. | 165/5 |
| 5,352,115 A * | 10/1994 | Klobucar | .................. | 432/181 |
| 5,376,340 A | 12/1994 | Bayer et al. | .................. | 422/175 |
| 5,460,789 A | 10/1995 | Wilhelm | .................. | 422/173 |
| 5,503,551 A | 4/1996 | Houston | .................. | 432/181 |
| 5,529,113 A | 6/1996 | Borowy | .................. | 165/9 |
| 5,538,693 A | 7/1996 | Olivier et al. | .................. | 422/111 |
| 5,540,584 A | 7/1996 | Greco | .................. | 432/181 |
| 5,562,442 A | 10/1996 | Wilhelm | .................. | 432/72 |
| 5,634,625 A | 6/1997 | Bruno | .................. | 251/313 |
| 5,664,942 A | 9/1997 | Bayer | .................. | 431/7 |
| 5,692,892 A | 12/1997 | Houston | .................. | 432/181 |
| 5,692,893 A | 12/1997 | Houston | .................. | 432/181 |
| 5,700,433 A | 12/1997 | Somary | .................. | 422/171 |
| 5,833,938 A | 11/1998 | Blazejewski | .................. | 422/175 |
| 5,837,205 A | 11/1998 | Bayer et al. | .................. | 422/109 |

(Continued)

FOREIGN PATENT DOCUMENTS

DE    3426662    1/1986

(Continued)

*Primary Examiner*—Ramesh Kirshnamurthy
*Assistant Examiner*—Andrew J. Rost
(74) *Attorney, Agent, or Firm*—Mitchell Bittman; Kevin Lemack

(57) ABSTRACT

Valve with heated sealing gas suitable for use in a regenerative thermal oxidizer, and oxidizer including the switching valve. The valve of the present invention exhibits excellent sealing characteristics and minimizes wear. In a preferred embodiment, the valve utilizes hot gas from the regenerative process to heat gas for sealing the valve, and sealing air flows through a heat exchanger that is positioned to be in contact with hot exhaust gas from the regenerative process.

13 Claims, 19 Drawing Sheets

U.S. PATENT DOCUMENTS

| | | | | |
|---|---|---|---|---|
| 5,871,349 A | 2/1999 | Johnson et al. | ............. | 432/180 |
| 5,888,063 A | 3/1999 | Scott et al. | ................. | 432/181 |
| 6,019,597 A * | 2/2000 | Martin et al. | ............... | 432/181 |
| 6,039,927 A | 3/2000 | Greco | ........................ | 422/175 |
| 6,261,092 B1 | 7/2001 | Cash | .......................... | 432/179 |

FOREIGN PATENT DOCUMENTS

| | | |
|---|---|---|
| DE | 4301748 | 7/1994 |
| DE | 19637090 | 12/1997 |
| DE | 19643821 | 1/1998 |
| DE | 19716877 | 12/1998 |
| DE | 4344750 | 1/1999 |
| DE | 19747905 | 1/1999 |
| DE | 19738678 | 3/1999 |
| EP | 0 117 564 | 2/1984 |
| EP | 0 137 670 | 8/1984 |
| EP | 0 222 463 | 1/1989 |
| EP | 0 218 590 | 3/1989 |
| EP | 0 365 262 | 10/1992 |
| EP | 0 587 064 | 9/1993 |
| EP | 0 548 630 | 5/1997 |
| EP | 0 702 195 | 5/1997 |
| EP | 0 719 984 | 5/1997 |
| EP | 0 715 706 | 5/1999 |
| EP | 0 811 143 | 11/1999 |
| EP | 0 697 562 | 12/1999 |
| GB | 2065855 | 3/1983 |
| GB | 2107445 | 2/1985 |
| GB | 2116306 | 8/1985 |
| GB | 2122329 | 9/1985 |
| GB | 2171178 | 11/1988 |
| GB | 2206682 | 1/1989 |
| GR | 880100286 | 5/1988 |
| SE | 503 802 | 3/1995 |
| WO | 84/04154 | 10/1984 |
| WO | 95/00809 | 1/1995 |
| WO | 96/24812 | 8/1996 |
| WO | 96/24813 | 8/1996 |
| WO | 96/41996 | 12/1996 |
| WO | 97/07374 | 2/1997 |
| WO | 97/21959 | 6/1997 |
| WO | 98/06993 | 2/1998 |
| WO | 98/06994 | 2/1998 |
| WO | 98/09491 | 3/1998 |
| WO | 98/44298 | 10/1998 |
| WO | 98/47592 | 10/1998 |

* cited by examiner

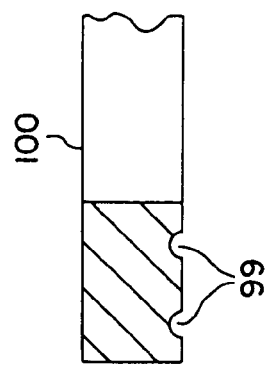
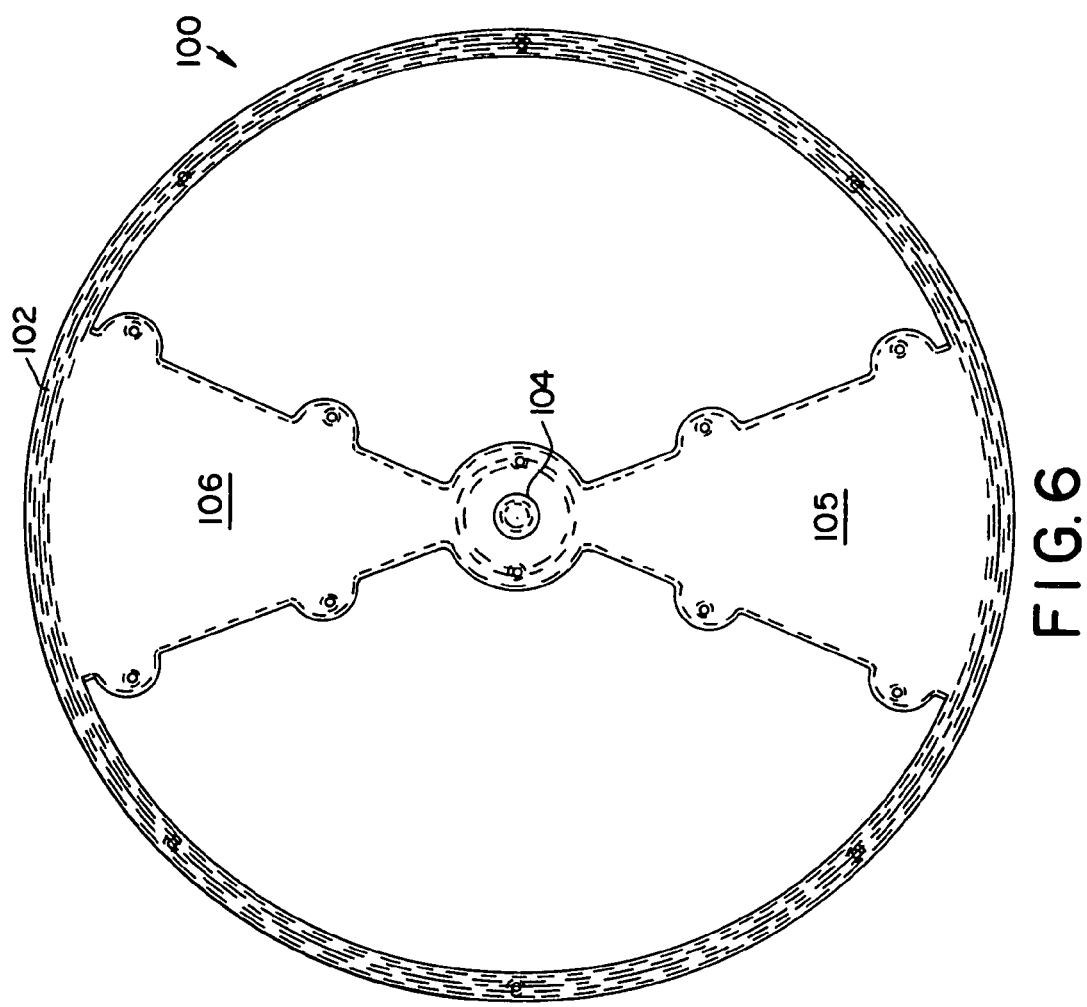

HEATED SEAL AIR FOR VALVE AND REGENERATIVE THERMAL OXIDIZER CONTAINING SAME

BACKGROUND OF THE INVENTION

Regenerative thermal oxidizers are conventionally used for destroying volatile organic compounds (VOCs) in high flow, low concentration emissions from industrial and power plants. Such oxidizers typically require high oxidation temperatures in order to achieve high VOC destruction. To achieve high heat recovery efficiency, the "dirty" process gas that is to be treated is preheated before oxidation. A heat exchanger column is typically provided to preheat these gases. The column is usually packed with a heat exchange material having good thermal and mechanical stability and sufficient thermal mass. In operation, the process gas is fed through a previously heated heat exchanger column, which, in turn, heats the process gas to a temperature approaching or attaining its VOC oxidation temperature. This pre-heated process gas is then directed into a combustion zone where any incomplete VOC oxidation is usually completed. The treated now "clean" gas is then directed out of the combustion zone and back through the heat exchanger column, or through a second heat exchange column. As the hot oxidized gas continues through this column, the gas transfers its heat to the heat exchange media in that column, cooling the gas and pre-heating the heat exchange media so that another batch of process gas may be preheated prior to the oxidation treatment. Usually, a regenerative thermal oxidizer has at least two heat exchanger columns, which alternately receive process and treated gases. This process is continuously carried out, allowing a large volume of process gas to be efficiently treated.

The performance of a regenerative oxidizer may be optimized by increasing VOC destruction efficiency and by reducing operating and capital costs. The art of increasing VOC destruction efficiency has been addressed in the literature using, for example, means such as improved oxidation systems and purge systems (e.g., entrapment chambers), and three or more heat exchangers to handle the untreated volume of gas within the oxidizer during switchover. Operating costs can be reduced by increasing the heat recovery efficiency, and by reducing the pressure drop across the oxidizer. Operating and capital costs may be reduced by properly designing the oxidizer and by selecting appropriate heat transfer packing materials.

An important element of an efficient oxidizer is the valving used to switch the flow of process gas from one heat exchange column to another. Any leakage of untreated process gas through the valve system will decrease the efficiency of the apparatus. In addition, disturbances and fluctuations in the pressure and/or flow in the system can be caused during valve switchover and are undesirable. Valve wear is also problematic, especially in view of the high frequency of valve switching in regenerative thermal oxidizer applications.

One conventional two-column design uses a single switching valve having an improved seal, as disclosed in U.S. Pat. No. 6,261,092 the disclosure of which is incorporated herein by reference. The valve has a seal plate that defines two chambers, each chamber being a flow port that leads to one of two regenerative beds of the oxidizer. The valve also includes a switching flow distributor that provides alternate channeling of the inlet or outlet process gas to each half of the seal plate. The valve operates between two modes: a stationary mode and a valve movement mode. In the stationary mode, a tight gas seal is used to minimize or prevent process gas leakage. The gas seal also seals during valve movement. Associated baffling minimizes or eliminates untreated process gas leakage across the valve during switchover. The use of a single valve, rather than the two or four conventionally used, significantly reduces the area that requires sealing. The geometry of the switching flow distributor reduces the distance and number of turns the process gas goes through since the flow distributor can be located close to the heat exchange beds. This reduces the volume of trapped, untreated gas during valve switching. Since the process gas passes through the same valve ports in the inlet cycle as in the outlet cycle, gas distribution to the heat exchange beds is improved. Valve switching with minimal pressure fluctuations, excellent sealing, and minimal or no bypass during switching are achieved in regenerative thermal oxidation applications. In view of the elimination of bypass during switching, the conventional entrapment chambers used to store the volume of unprocessed gas in the system during switching can be eliminated, thereby saving substantial costs.

Seal air has been used to enhance the ability for such flow control valves to direct flow into and out of regenerative thermal and catalytic oxidizers, for example. This is accomplished by using positive or negative pressurized gas directed at the seating surfaces of the valve. Typically the air used for sealing is external air at or near ambient temperature. In systems using positive pressure gas, the cooling effect of this seal air can cause deposits on the valve seat due to condensable or sticky particulate in the process gas stream. This is especially problematic in graphic arts applications, where the presence of condensables is common in the process gas.

It therefore would be desirable to reduce or eliminate the condensation of substances in such oxidizers.

SUMMARY OF THE INVENTION

The problems of the prior art have been overcome by the present invention, which provides a gas seal for a switching valve, and a regenerative thermal oxidizer including the switching valve. The seal of the present invention utilizes gas, preferably air, that is at a sufficiently high temperature to minimize or eliminate condensation of substances that would otherwise condense as a result of being cooled by the sealing gas. In a preferred embodiment, the sealing gas is heated by heat exchange with exhaust air from the regenerative thermal oxidizer, thereby providing a cost-effective solution to deleterious condensation.

Strategic location of the heat exchanger for heating the sealing gas allows for compact construction and simplicity in retrofitting the heat exchanger into existing units.

BRIEF DESCRIPTION OF THE DRAWINGS

FIG. 6 is a top view of the seal plate of a valve suitable for use with the present invention;

FIG. 6A is a cross-sectional view of a portion of the seal plate of FIG. 6;

DETAILED DESCRIPTION OF THE PRESENT INVENTION

Although the majority of the following description illustrates the use of heated sealing gas in the context of the switching valve of U.S. Pat. No. 6,261,092, it is noted that the invention is not intended to be limited to any particular valve and can be employed in any valve system that includes a source of heat.

Figure 1:
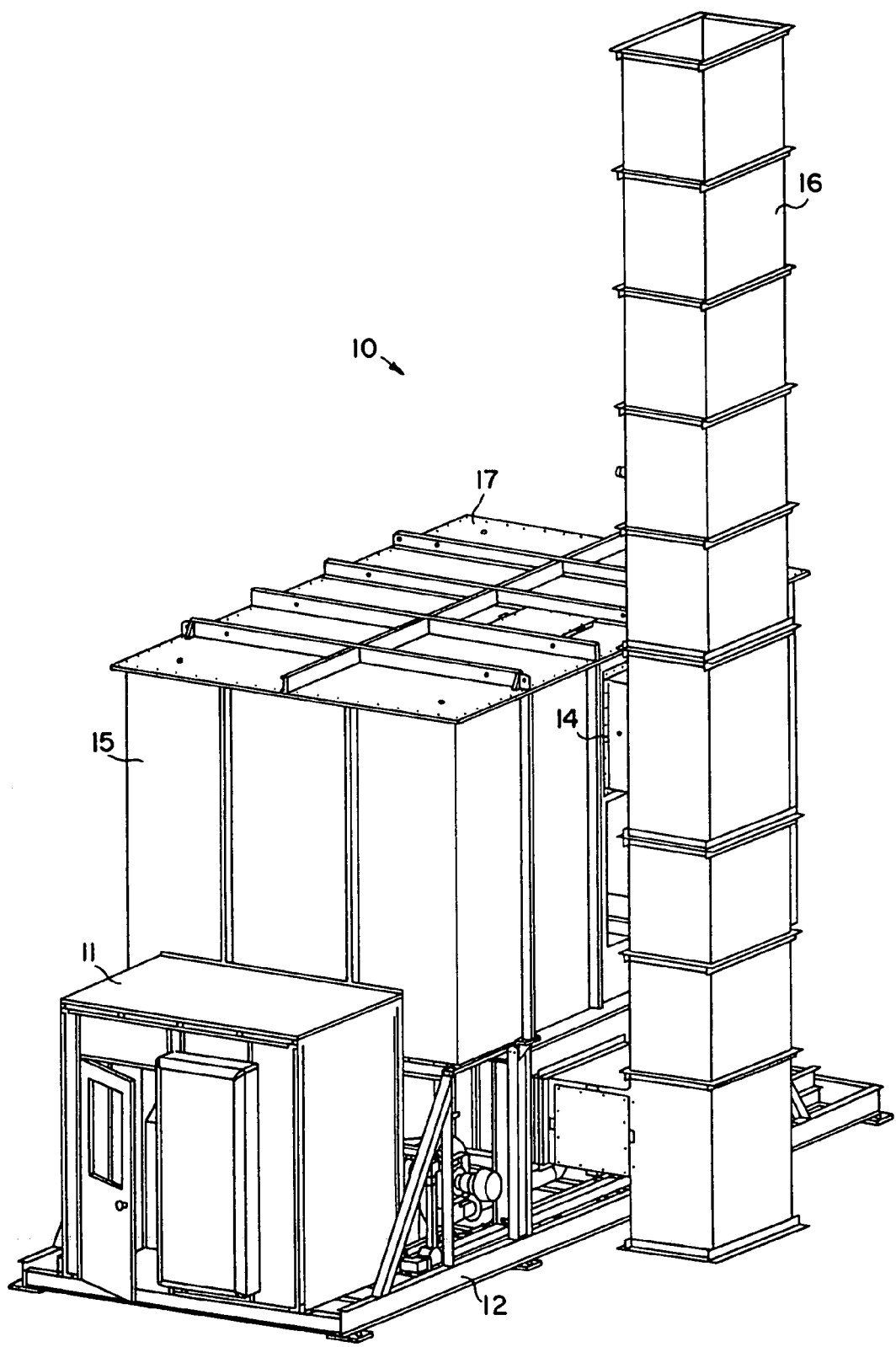
FIG. 1 is a perspective view of a regenerative thermal oxidizer in accordance with one embodiment of the present invention.
Figure 2:
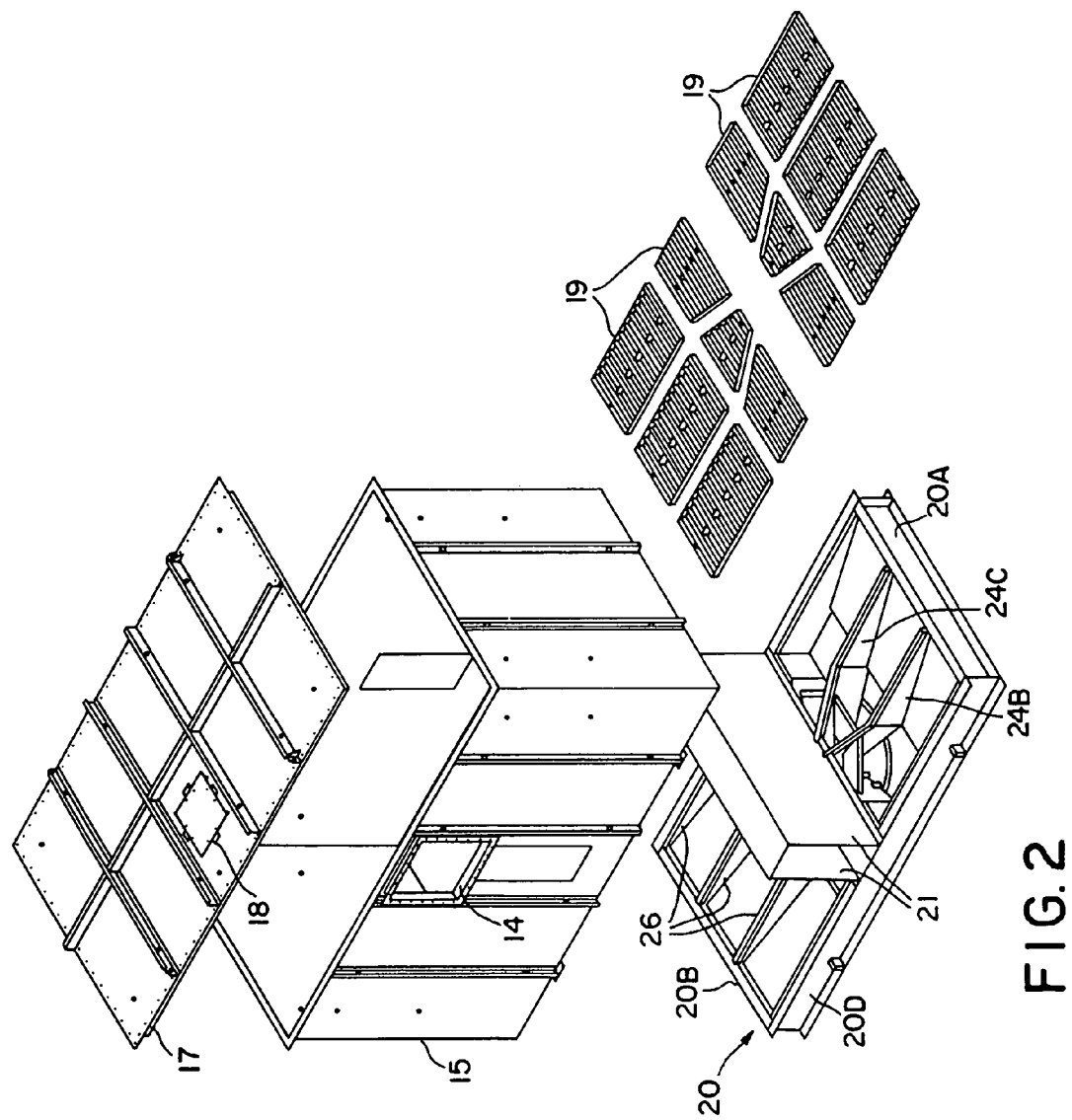
FIG. 2 is a perspective exploded view of a portion of a regenerative thermal oxidizer in accordance with one embodiment of the present invention.

Familiarity with the valve disclosed in the '092 patent is assumed. Briefly, FIGS. 1 and 2 show a two-chamber regenerative thermal oxidizer 10 (catalytic or non-catalytic) supported on a frame 12 as shown. The oxidizer 10 includes housing 15 in which there are first and second heat exchanger chambers in communication with a centrally located combustion zone. A burner (not shown) may be associated with the combustion zone, and a combustion blower may be supported on the frame 12 to supply combustion air to the burner. The combustion zone includes a bypass outlet 14 in fluid communication with exhaust stack 16 typically leading to atmosphere. A control cabinet 11 houses the controls for the apparatus and is also preferably located on frame 12. Opposite control cabinet 11 is a fan (not shown) supported on frame 12 for driving the process gas into the oxidizer 10. Housing 15 includes a top chamber or roof 17 having one or more access doors 18 providing operator access into the housing 15. Those skilled in the art will appreciate that the foregoing description of the oxidizer is for illustrative purposes only; other designs are well within the scope of the present invention, including oxidizers with more or less than two chambers, oxidizers with horizontally oriented chamber(s), and catalytic oxidizers.

A cold face plenum 20 forms the base of housing 15 as best seen in FIG. 2. Suitable support grating 19 is provided on the cold face plenum 20 and supports the heat exchange matrix in each heat exchange column as is discussed in greater detail below. In the embodiment shown, the heat exchange chambers are separated by separation walls 21, which are preferably insulated. Also in the embodiment shown, flow through the heat exchange beds is vertical; process gas enters the beds from the valve ports located in the cold face plenum 20, flows upwardly (towards roof 17) into a first bed, enters the combustion zone in communication with the first bed, flows out of the combustion zone and into a second chamber, where it flows downwardly through a second bed towards the cold face plenum 20. However, those skilled in the art will appreciate that other orientations are suitable including a horizontal arrangement, such as one where the heat exchange columns face each other and are separated by a centrally located combustion zone.

Figure 4:
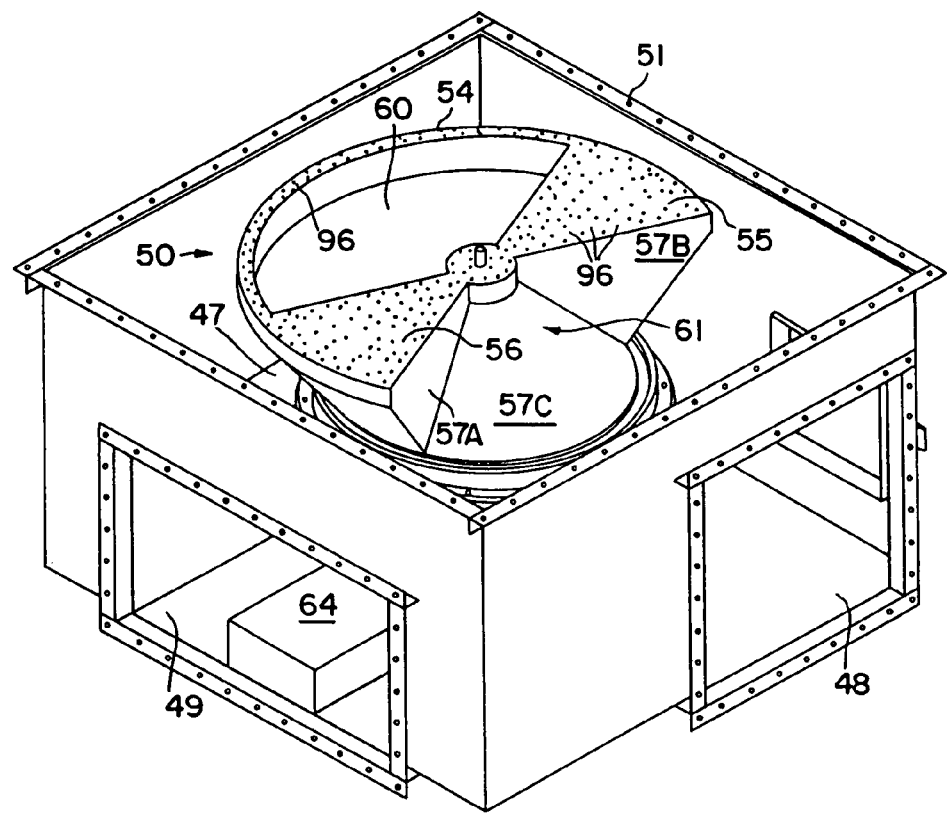
FIG. 4 is a perspective view of a flow distributor forming part of a switching valve suitable for use with the present invention.

FIG. 4 is a view of the valve ports 25 from the bottom. Plate 28 has two opposite symmetrical openings 29A and 29B, which, with the baffles 26 (FIG. 2), define the valve ports 25. Situated in each valve port 25 is an optional turn vane 27. Each turn vane 27 has a first end secured to the plate 28, and a second end spaced from the first end secured to the baffle 24 on each side. Each turn vane 27 widens from its first end toward its second end, and is angled upwardly at an angle and then flattens to horizontal at 27A as shown in FIG. 4. The turn vanes 27 act to direct the flow of process gas emanating from the valve ports away from the valve ports to assist in distribution across the cold face plenum during operation. Uniform distribution into the cold face plenum 20 helps ensure uniform distribution through the heat exchange media for optimum heat exchange efficiency.

Figure 4A:
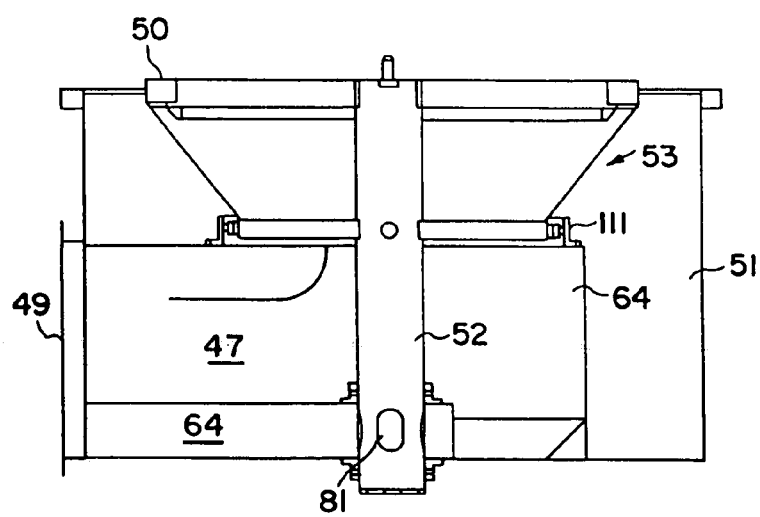
FIG. 4A is a cross-sectional view of the flow distributor of FIG. 4.

FIGS. 4 and 4A show the flow distributor 50 contained in a manifold 51 having a process gas inlet 48 and a process gas outlet 49 (although element 48 could be the outlet and 49 the inlet, for purposes of illustration the former embodiment will be used herein). The flow distributor 50 includes a preferably hollow cylindrical drive shaft 52 (FIGS. 4A, 6) that is coupled to a drive mechanism. Coupled to the drive shaft 52 is a partial frusto-conically shaped member 53. The member 53 includes a mating plate formed of two opposite pie-shaped sealing surfaces 55, 56, each connected by circular outer edge 54 and extending outwardly from the drive shaft 52 at an angle of 45°, such that the void defined by the two sealing surfaces 55, 56 and outer edge 54 defines a first gas route or passageway 60. Similarly, a second gas route or passageway 61 is defined by the sealing surfaces 55, 56 opposite the first passageway, and three angled side plates, namely, opposite angled side plates 57A, 57B, and central angled side plate 57C. The angled side plates 57 separate passageway 60 from passageway 61. The top of these passageways 60, 61 are designed to match the configuration of symmetrical openings 29A, 29B in the plate 28, and in the assembled condition, each passageway 60, 61 is aligned with a respective openings 29A, 29B. Passageway 61 is in fluid communication with only inlet 48, and passageway 60 is in fluid communication with only outlet 49 via plenum 47, regardless of the orientation of the flow distributor 50 at any given time. Thus, process gas entering the manifold 51 through inlet 48 flows through only passageway 61, and process gas entering passageway 60 from the valve ports 25 flows only through outlet 49 via plenum 47.

Figure 3:
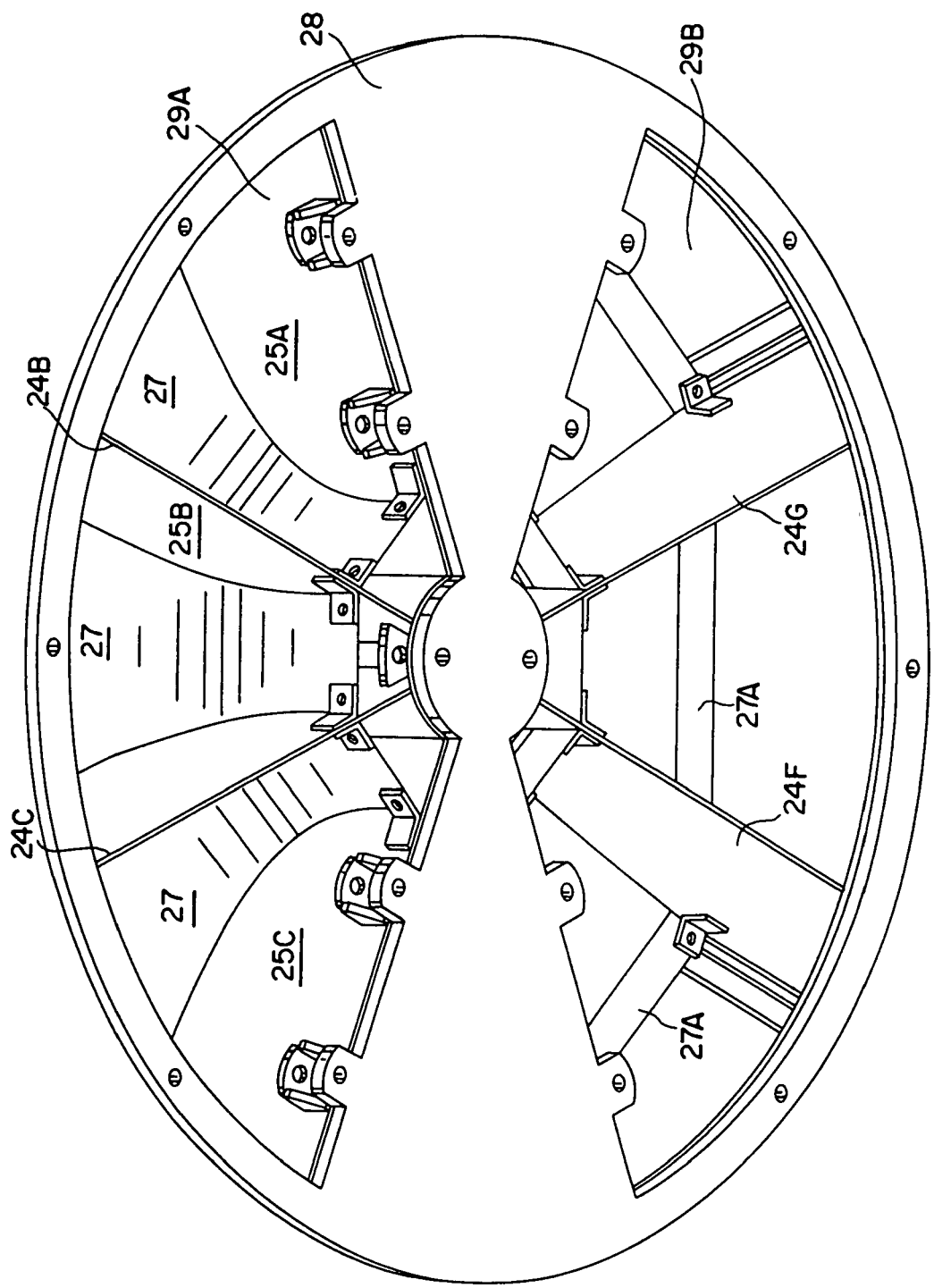
FIG. 3 is a bottom perspective view of valve ports forming part of a valve suitable for use with the present invention.

A sealing plate 100 (FIG. 6) is coupled to the plate 28 defining the valve ports 25 (FIG. 3). Preferably an air seal is used between the top surface of the flow distributor 50 and the seal plate 100, as discussed in greater detail below. The flow distributor is rotatable about a vertical axis, via drive shaft 52, with respect to the stationary plate 28. Such rotation moves the sealing surfaces 55, 56 into and out of blocking alignment with portions of openings 29A, 29B.

Figure 5:
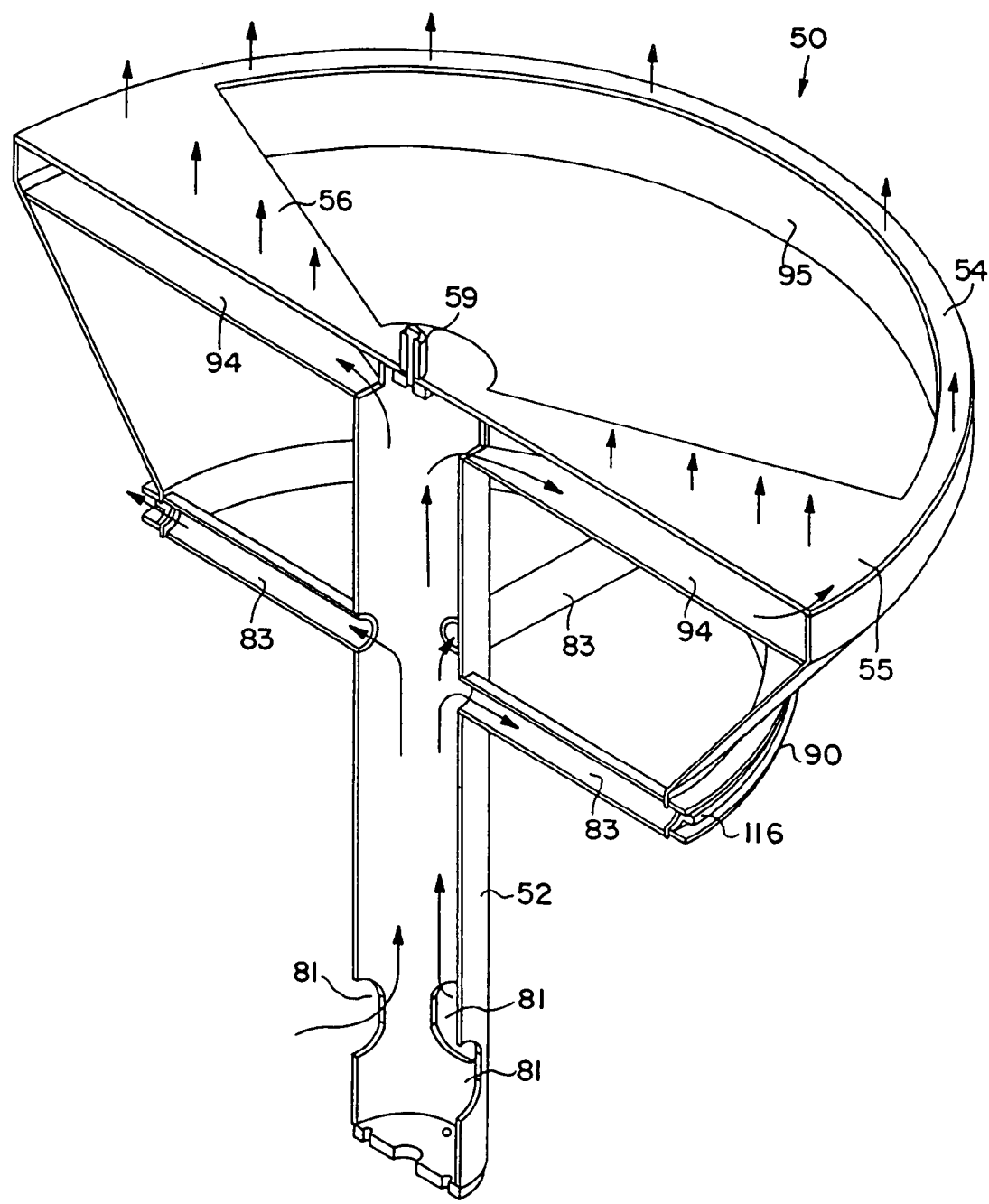
FIG. 5 is a perspective view of a portion of the flow distributor of FIG. 4.
Figure 7:
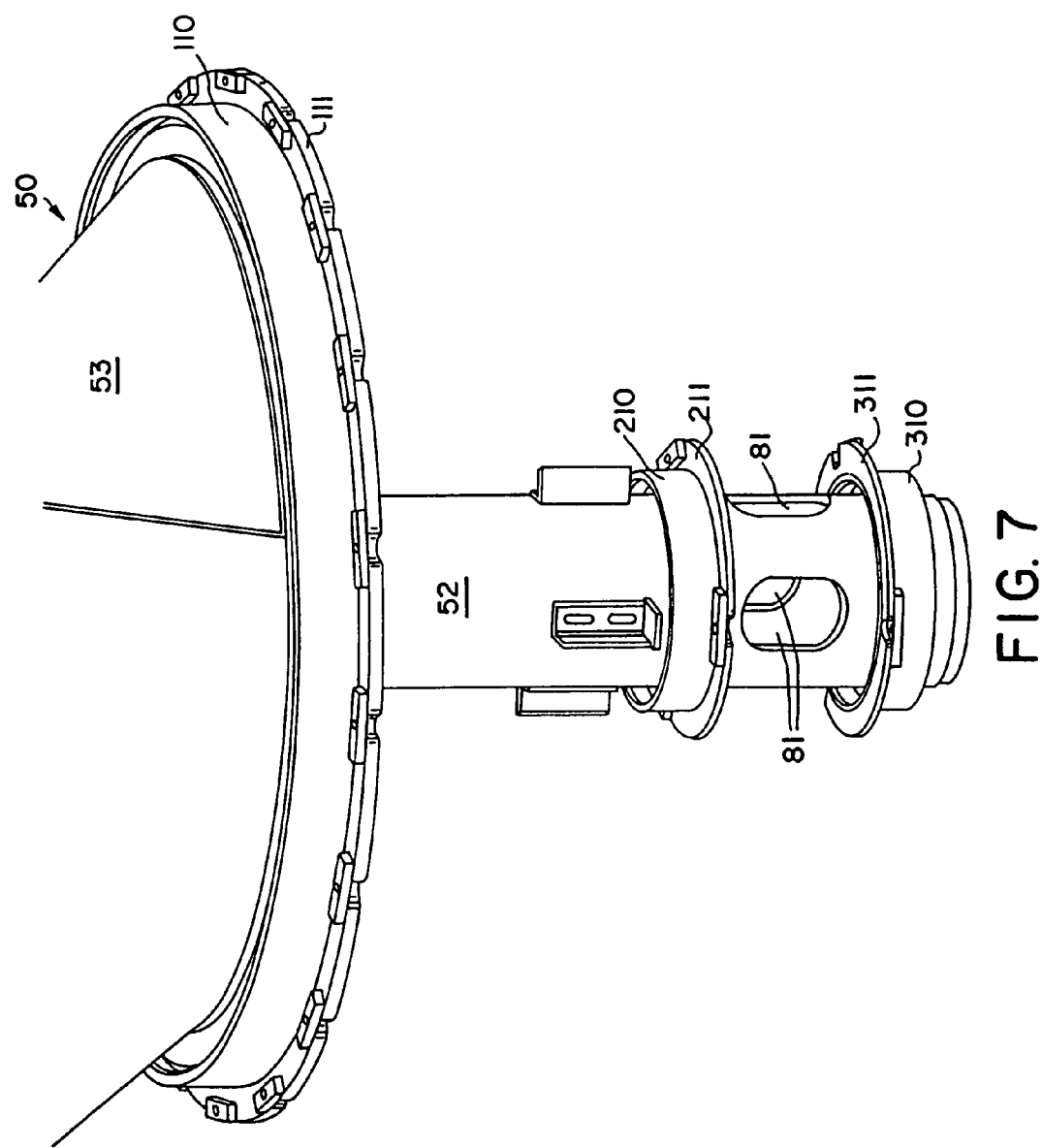
FIG. 7 is a perspective view of the shaft of the flow distributor of FIG. 4.

The method for sealing the valve will now be discussed first with reference to FIGS. 4, 6 and 7. The flow distributor 50 rides on a cushion of air, in order to minimize or eliminate wear as the flow distributor moves. Those skilled in the art will appreciate that gases other than air could be used, although air is preferred and will be referred to herein for purposes of illustration. A cushion of air not only seals the valve, but also results in frictionless or substantially frictionless flow distributor movement. A pressurized delivery system, such as a fan or the like, which can be the same or different from the fan used to supply the combustion air to the combustion zone burner, supplies air to the drive shaft 52 of the flow distributor 50 via suitable ducting (not shown) and plenum 64. As best seen in FIG. 7, the air travels from the ducting into the drive shaft 52 via one or more apertures 81 formed in the body of the drive shaft 52 above the base 82 of the drive shaft 52 that is coupled to the drive mechanism 70. The exact location of the apertures(s) 81 is not particularly limited, although preferably the apertures 18 are symmetrically located about the shaft 52 and are equally sized for uniformity. The pressurized air flows up the shaft as depicted by the arrows in FIG. 5, and a portion enters on or more radial ducts 83 which communicate with and feed a ring seal located at the annular rotating port 90 as discussed in greater detail below. A portion of the air that does not enter the radial ducts 83 continues up the drive shaft 52 until it reaches passageways 94, which distribute the air in a channel having a semi-annular portion 95 and a portion defined by the pie-shaped wedges 55, 56.

The mating surface of the flow distributor 50, in particular, the mating surfaces of pie-shaped wedges 55, 56 and outer annular edge 54, are formed with a plurality of apertures 96 as shown in FIG. 4. The pressurized air from channel 95 escapes from channel 95 through these apertures 96 as shown by the arrows in FIG. 5, and creates a cushion of air between the top surface of the flow distributor 50 and a stationary seal plate 100 shown in FIG. 6. The seal plate 100 includes an annular outer edge 102 having a width corresponding to the width of the top surface 54 of the flow distributor 50, and a pair of pie-shaped elements 105, 106 corresponding in shape to pie-shaped wedges 55, 56 of the flow distributor 50. It matches (and is coupled to) plate 28 (FIG. 3) of the valve port. Aperture 104 receives shaft pin 59 (FIG. 5) coupled to the flow distributor 50. The underside of the annular outer edge 102 facing the flow distributor includes one or more annular grooves 99 (FIG. 6A) which align with the apertures 96 in the mating surface of the flow distributor 50. Preferably there are two concentric rows of grooves 99, and two corresponding rows of apertures 96. Thus, the grooves 99 aid in causing the air escaping from apertures 96 in the top surface 54 to form a cushion of air between the mating surface 54 and the annular outer edge 102 of the seal plate 100. In addition, the air escaping the apertures 96 in the pie-shaped portions 55, 56 forms a cushion of air between the pie-shaped portions 55, 56 and the pie-shaped portions 105, 106 of the seal plate 100. These cushions of air minimize or prevent leakage of the process gas that has not been cleaned into the flow of clean process gas. The relatively large pie-shaped wedges of both the flow distributor 50 and the seal plate 100 provide a long path across the top of the flow distributor 50 that uncleaned gas would have to traverse in order to cause leakage. Since the flow distributor is stationary the majority of time during operation, an impenetrable cushion of air is created between all of the valve mating surfaces. When the flow distributor is required to move, the cushion of air used to seal the valve now also functions to eliminate any high contact pressures from creating wear between the flow distributor 50 and the seal plate 100.

Preferably the pressurized air is delivered from a fan different from that delivering the process gas to the apparatus in which the valve is used, so that the pressure of the sealing air is higher than the inlet or outlet process gas pressure, thereby providing a positive seal.

Figure 14:
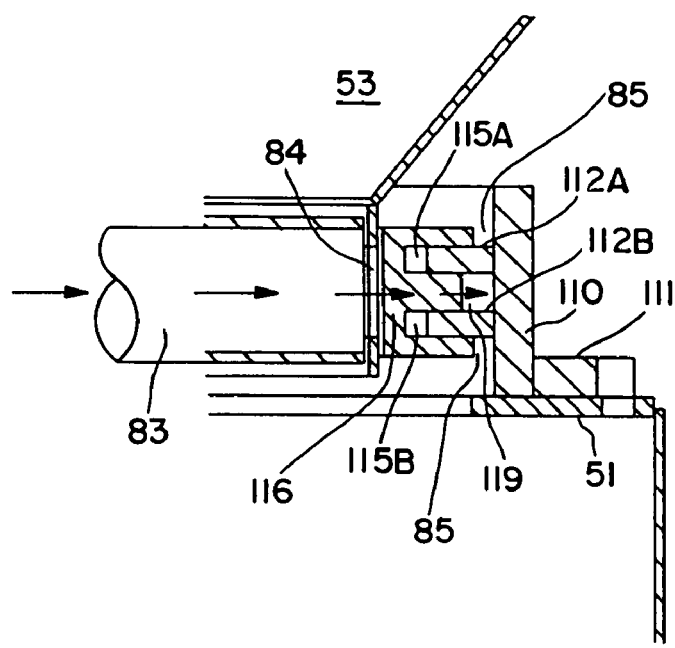
FIG. 14 is a cross-sectional view of the rotating port of a flow distributor suitable for use with the present invention.

The flow distributor 50 includes a rotating port as best seen in FIGS. 7 and 14. The frusto-conical section 53 of the flow distributor 50 rotates about an annular cylindrical wall 110 that functions as an outer ring seal. The wall 110 includes an outer annular flange 111 used to center the wall 110 and clamp it to the manifold 51 (see also FIG. 4). An E-shaped inner ring seal member 116 (preferably made of metal) is coupled to the flow distributor 50 and has a pair of spaced parallel grooves 115A, 115B formed in it. Piston ring 112A sits in groove 115A, and piston ring 112B sits in groove 115B as shown. Each piston ring 112 biases against the outer ring seal wall 110, and remains stationary even as the flow distributor 50 rotates. Pressurized air (or gas) flows through the radial ducts 83 as shown by the arrows in FIG. 14, through apertures 84 communicating with each radial duct 83, and into the channel 119 between the piston rings 112A, 112B, as well as in the gap between each piston ring 112 and the inner ring seal 116. As the flow distributor rotates with respect to stationary cylindrical wall 110 (and the piston rings 112A, 112B), the air in channel 119 pressurizes the space between the two piston rings 112A, 112B, creating a continuous and non-friction seal. The gap between the piston rings 112 and the inner piston seal 116, and the gap 85 between the inner piston seal 116 and the wall 110, accommodate any movement (axial or otherwise) in the drive shaft 52 due to thermal growth or other factors. Those skilled in the art will appreciate that although a dual piston ring seal is shown, three or more piston rings also could be employed for further sealing. Positive or negative pressure can be used to seal.

Figure 15:
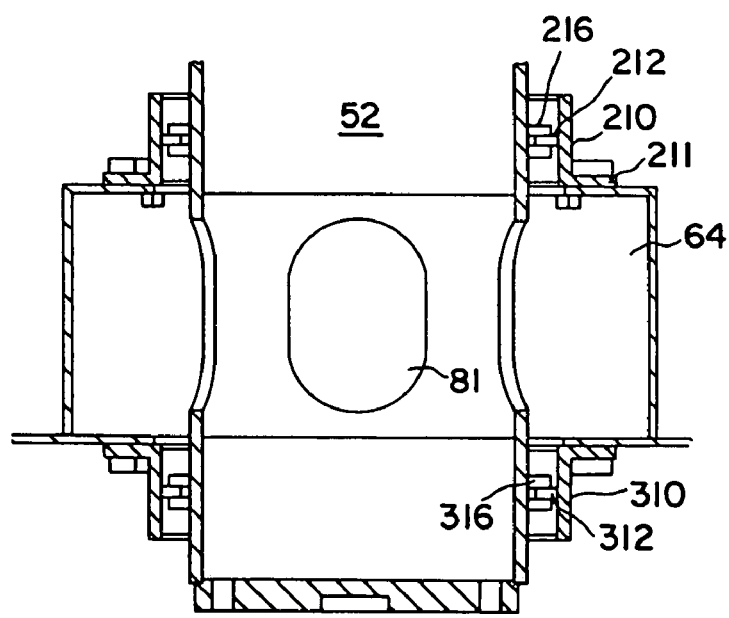
FIG. 15 is a cross-sectional view of the lower portion of the drive shaft of the flow distributor suitable for use with the present invention.

FIG. 15 illustrates how the plenum 64 feeding the shaft 52 with pressurized air is sealed against the drive shaft 52. The sealing is in a manner similar to the rotating port discussed above, except that the seals are not pressurized, and only one piston ring need by used for each seal above and below the plenum 64. Using the seal above the plenum 64 as exemplary, a C-shaped inner ring seal 216 is formed by boring a central groove therein. A stationary annular cylindrical wall 210 that functions as an outer ring seal includes an outer annular flange 211 used to center the wall 210 and clamp it to the plenum 64. A stationary piston ring 212 sits in the groove formed in the C-shaped inner ring seal 216 and biases against the wall 210. The gap between the piston ring 212 and the bore of the C-shaped inner seal 216, as well as the gap between the C-shaped inner seal 216 and the outer cylindrical wall 210, accommodates any movement of the drive shaft 52 due to thermal expansion or the like. A similar cylindrical wall 310, C-shaped inner seal 316 and piston ring 312 is used on the opposite side of the plenum 64 as shown in FIG. 15.

Figure 18:
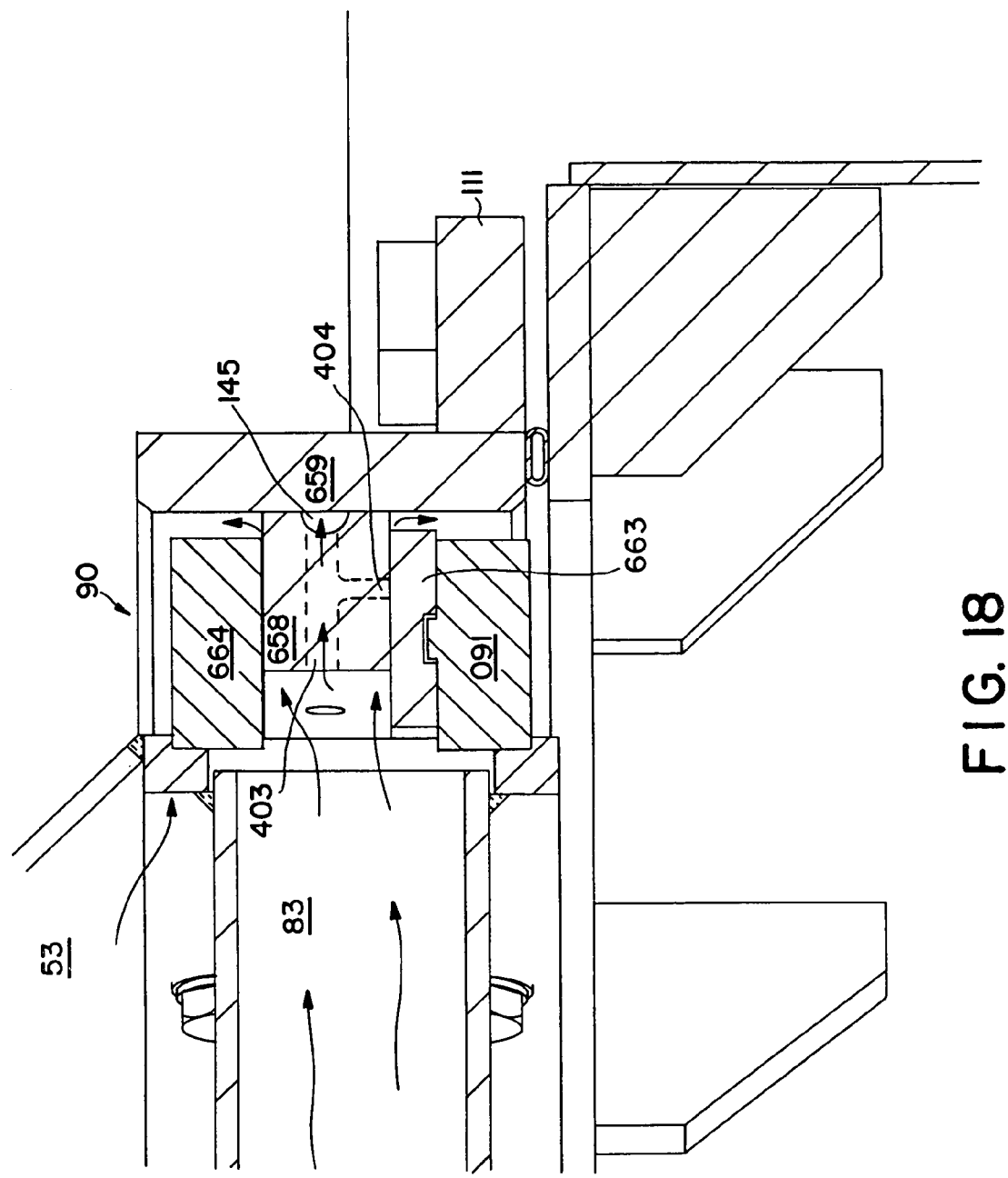
FIG. 18 is a cross-sectional view of the rotating port of a valve suitable for use with the present invention.
Figure 18A:
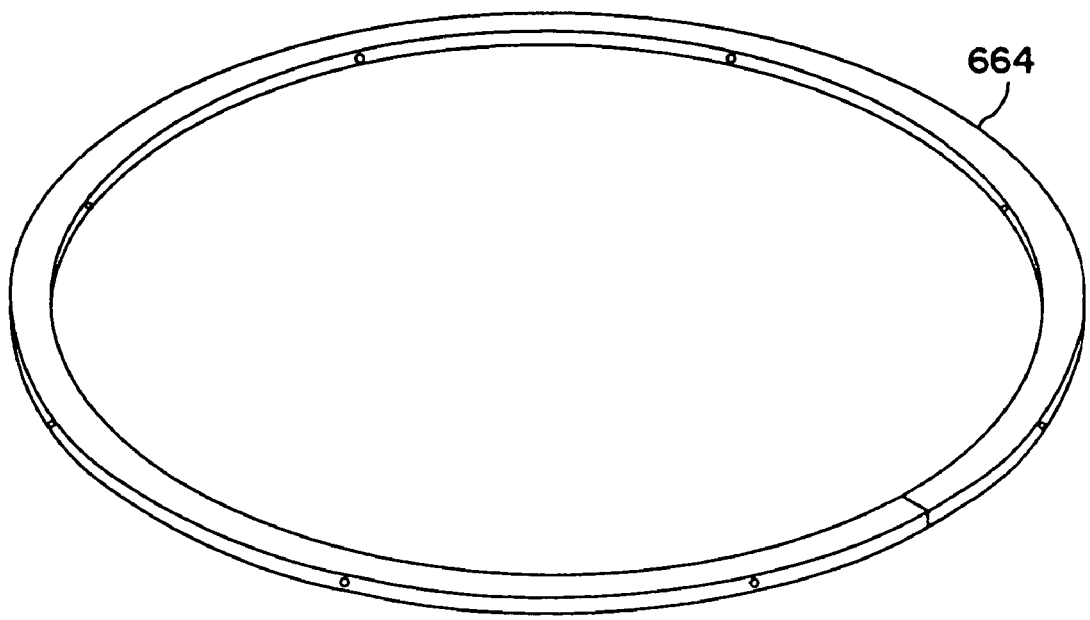
FIG. 18A is a perspective view of the retaining ring for sealing a valve suitable for use with the present invention.
Figure 18B:
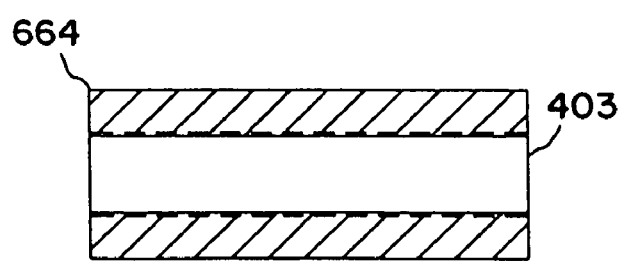
FIG. 18B is a cross-sectional view of the retaining ring of FIG. 18A.
Figure 18C:
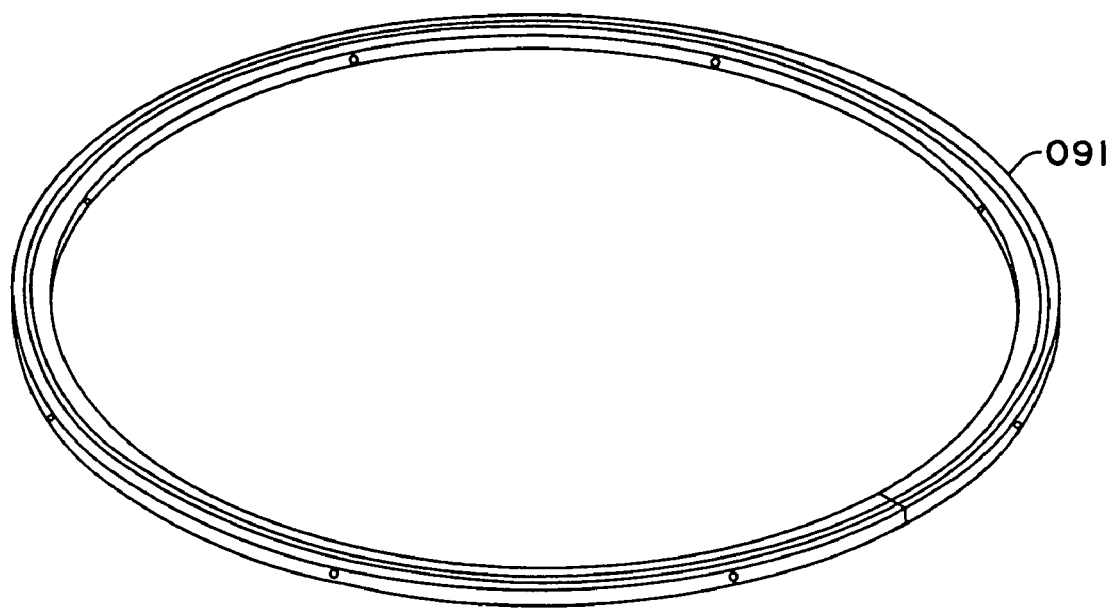
FIG. 18C is a perspective view of the mounting ring for sealing a valve suitable for use with the present invention.
Figure 18D:
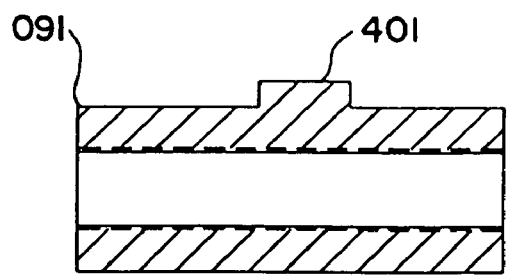
FIG. 18D is a cross-sectional view of the mounting ring of FIG. 18C.
Figure 18E:
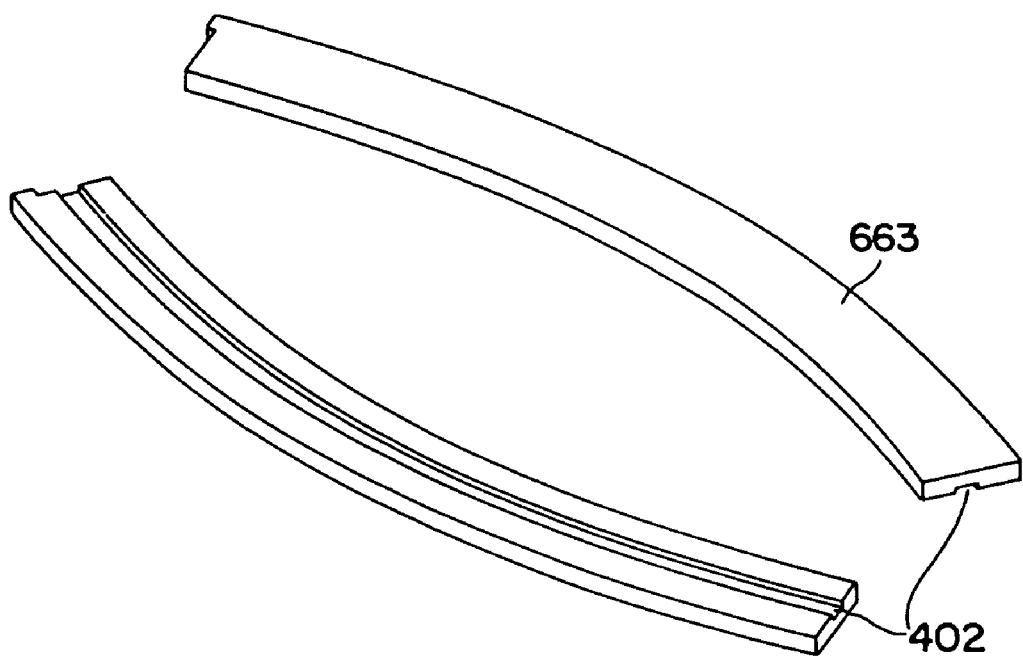
FIG. 18E is a perspective view of the plate bearing arc for valve suitable for use with the present invention.
Figure 18F:
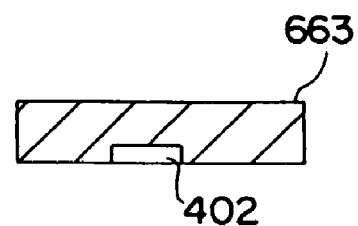
FIG. 18F is a cross-sectional view of the plate bearing arc of FIG. 18E.
Figure 18G:
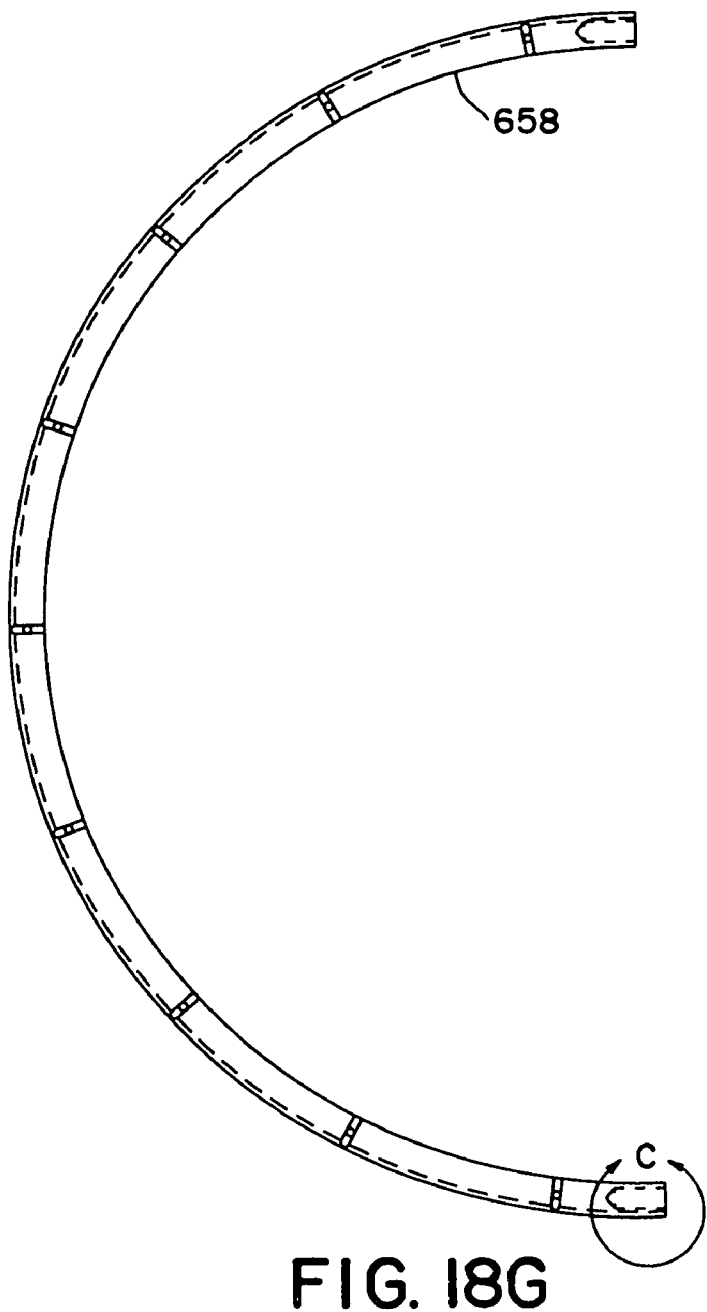
FIG. 18G is a perspective view of one embodiment of the seal ring for a valve suitable for use with the present invention.
Figure 18H:
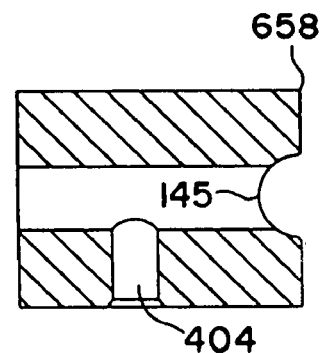
FIG. 18H is a cross-sectional view of the seal ring of FIG. 18G.
Figure 18I:
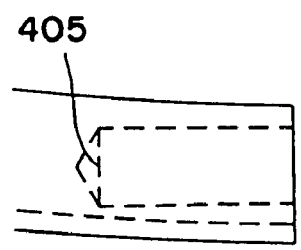
FIG. 18I is a cross-sectional view of the recess in the seal ring of FIG. 18G.

An alternative embodiment for sealing is shown in FIGS. 18-18I and is as shown in co-pending U.S. patent application Ser. No. 09/849,785, the disclosure of which is hereby incorporated by reference. Turning to FIG. 18, retaining ring seal 664, preferably made of carbon steel, is shown attached to rotating assembly 53. The retaining seal ring 664 is preferably a split ring as shown in perspective view in FIG. 18A, and has a cross-section as shown in FIG. 18B. Splitting the ring facilitates installation and removal. The retaining seal ring 664 can be attached to the rotating assembly 53 with a cap screw 140, although other suitable means for attaching the ring 664 could be used. Preferably, the rotating assembly includes a groove for properly positioning the retaining ring seal in place.

Opposite retaining seal ring 664 is mounting ring 091, best seen in FIGS. 18C and 18D. The mounting ring 091 is also coupled to rotating assembly 53 with cap screw 140', and a groove for properly positioning the mounting ring 091 is formed in the rotating assembly.

In the embodiment shown, where the rotating assembly rotates about a vertical axis, the weight of the seal ring 658 can result in wear as it slides against the mounting ring 091. In order to reduce or eliminate this wear, the mounting ring 663 is formed with a tongue 401 formed along its circumference, preferably centrally located as best shown in FIG. 18D. An optional plate-bearing arc 663 has a groove 402 (FIGS. 18E, 18F) corresponding in shape and location to the tongue 401, and seats over the mounting ring 091 when assembled as shown in FIG. 18. The plate-bearing arc 663 is preferably made of a material different from seal ring 658 to facilitate its function as a bearing. Suitable materials include bronze, ceramic, or other metal different from the metal used as the material for seal ring 658.

Figure 11:
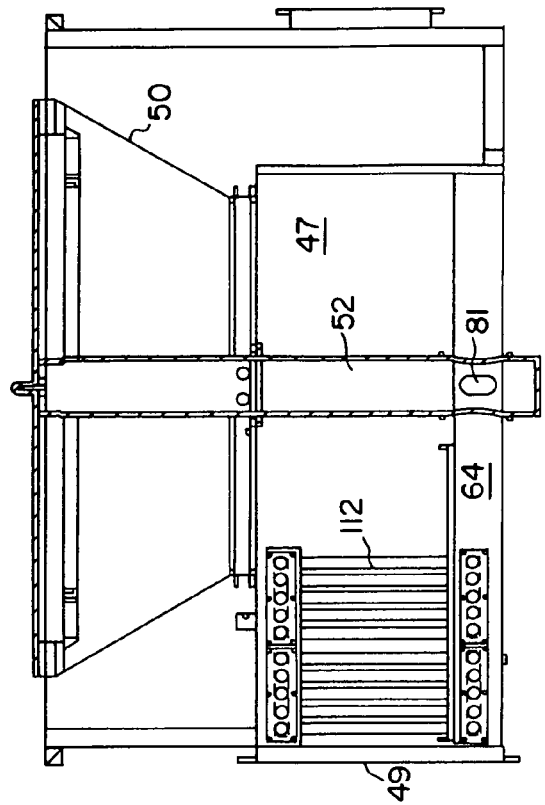
FIG. 11 is a cross-sectional view of the flow distributor and of the heat exchanger in the gas outlet plenum in accordance with an embodiment of the present invention.
Figure 10:
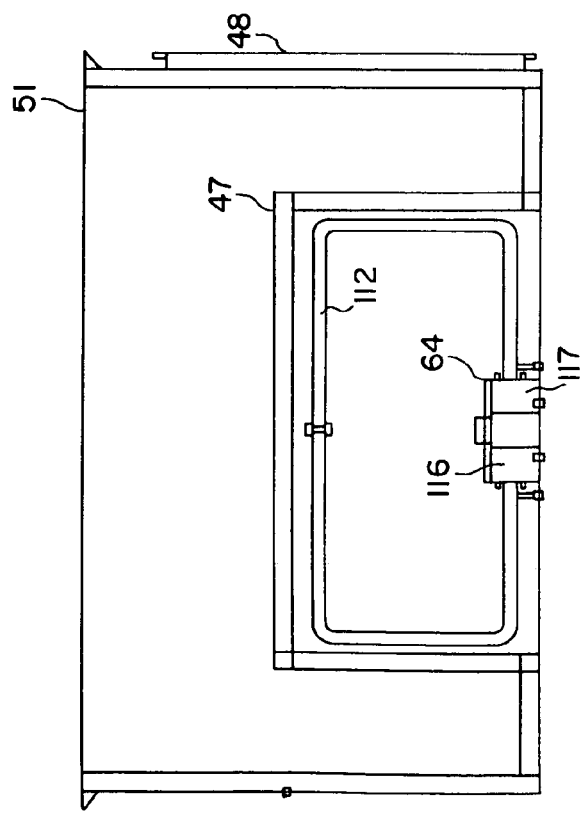
FIG. 10 is a front view of the gas outlet plenum and sealing gas plenum in accordance with the present invention.

Positioned between retaining seal ring 664 and arc 663 is seal ring 658. As shown in FIGS. 18G and 18H, the seal ring 658 has a radial slot 403 formed throughout its circumference. At one edge of the seal ring 658, the radial slot 403 terminates in a circumferential semi-circular configuration, so that a distribution groove 145 is created when the seal ring 658 abuts against the ring seal housing 659, as shown in FIG. 11. Alternatively, more than one radial slot 403 could be used. In the embodiment shown, ring seal 658 also has a bore 404 formed in communication with and orthogonally to radial slot 403. By pressurizing this bore 404, a counterbalance is created whereby the seal ring 658 is inhibited from moving downwardly due to its own weight. If the orientation of the valve were different, such as rotated 180°, the bore 404 could be formed in the upper portion of seal ring 658. Alternatively, more than one bore 404 could e used in the upper or lower portions, or both. If the orientation were rotated 90°, for example, no counterbalance would be necessary. Since seal ring 658 remains stationary and the housing is stationary, seal 658 need not be round; other shapes including oval and octagonal also are suitable. The ring seal 658 can be made of a single piece, or could be two or more pieces.

The ring seal 658 biases against ring seal housing 659, and remains stationary even as the flow distributor 50 (and seal ring 664, plate bearing 663 and mounting ring 091) rotates. Pressurized air (or gas) flows through the radial ducts 83 as shown by the arrows in FIG. 18, and into the radial slot 403 and bore 404, as well as in the distribution groove 145 between the ring seal 658 and housing 659, the gap between the retaining ring seal 664 and housing 659, and the gaps between the arc 663 and housing 659 and mounting ring 091 and housing 659. As the flow distributor rotates with respect to stationary housing 659 (and the stationary seal ring 658), the air in these gaps pressurizes these spaces creating a continuous and non-friction seal. The distribution groove 145 divides the outside surface of the ring seal 658 into three zones, with two in contact with the outer bore, and a center pressure zone.

By using a single sealing ring assembly, forces which push or pull dual piston ring seals apart are eliminated. In addition, a savings is realized as the number parts are reduced, and a single ring can be made of a larger cross-section and thereby can be made from more dimensionally stable components. The ring can be split into two halves to allow for easier installation and replacement. Compression springs or other biasing means can be placed in recessed holes 405 (FIG. 18I) at the split to provide outward force of the ring to the bore.

FIG. 15 illustrates how the plenum 64 feeding the shaft 52 with pressurized air is sealed against the drive shaft 52. The sealing is in a manner similar to the rotating port discussed above, except that the seals are not pressurized, and only one piston ring need by used for each seal above and below the plenum 64. Using the seal above the plenum 64 as exemplary, a C-shaped inner ring seal 216 is formed by boring a central groove therein. A stationary annular cylindrical wall 210 that functions as an outer ring seal includes an outer annular flange 211 used to center the wall 210 and clamp it to the plenum 64. A stationary piston ring 212 sits in the groove formed in the C-shaped inner ring seal 216 and biases against the wall 210. The gap between the piston ring 212 and the bore of the C-shaped inner seal 216, as well as the gap between the C-shaped inner seal 216 and the outer cylindrical wall 210, accommodates any movement of the drive shaft 52 due to thermal expansion or the like. A similar cylindrical wall 310, C-shaped inner seal 316 and piston ring 312 is used on the opposite side of the plenum 64 as shown in FIG. 15.

Figure 9:
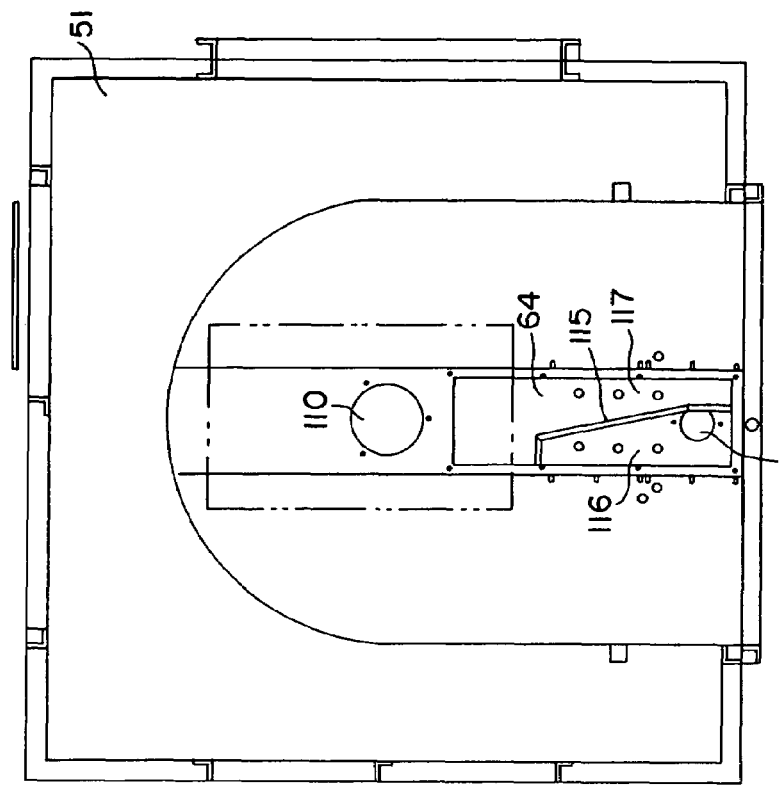
FIG. 9 is a top view of the sealing gas plenum with the heat exchanger removed for clarity, in accordance with the present invention.
Figure 8:
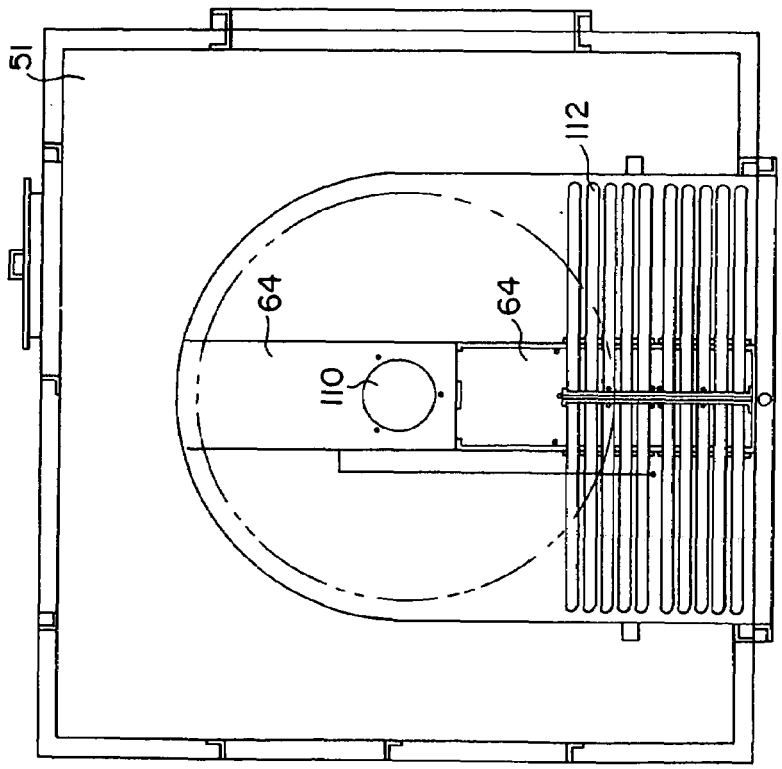
FIG. 8 is a top view of the heat exchanger positioned in the outlet gas plenum in accordance with the present invention.
Figure 12:
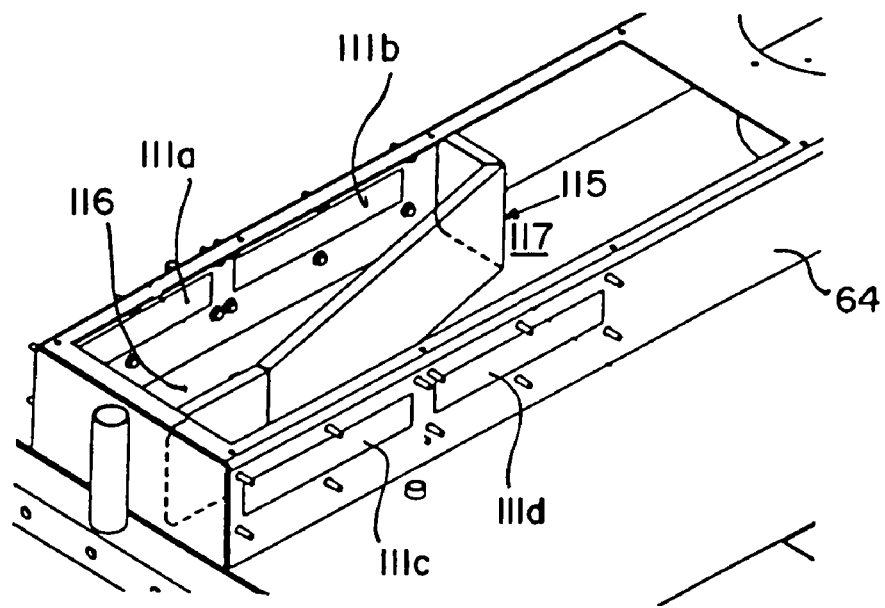
FIG. 12 is a perspective view of the baffle in the sealing gas plenum in accordance with the present invention.

Turning now to FIGS. 8 and 9, the preferred embodiment for heating the sealing air is illustrated. Cool air that normally enters aperture 110 in plenum 64 housed in manifold 51 and flows into the shaft 52 through apertures 81 is instead diverted into heat exchanger 112. With particular reference to FIGS. 9 and 12, the preferred way to divert the flow of cool air is with a baffle 115 positioned in plenum 64. The baffle 115 extends from the floor of the plenum 64 to the ceiling of the plenum 64, thereby segregating the plenum 64 into a heat exchanger inlet section 116 and a heat exchanger outlet section 117. The aperture 110 is positioned entirely in the heat exchanger inlet section 116, so that cold air flowing from the aperture 110 into the plenum 64 resides only in inlet section 116 and is forced into the inlet of the heat exchanger 112 (via slots 111a, 111b) where it is heated to a temperature sufficient to minimize or prevent cooling of the process gas condensables. Suitable temperatures are those above the dew point of the process gas, generally from about 150° F. to about 250° F. The heated sealing air exits the heat exchanger on the opposite side of the baffle into heat exchanger outlet portion 117 of plenum 64 (via slots 111c, 111d), and enters the drive shaft 52 in fluid communication with outlet section 117 of the plenum 64 in a heated state. Since the inlet section 116 is not in fluid communication with the drive shaft 52, unheated seal air cannot enter the drive shaft until it has passed through the heat exchanger. The drive shaft 52 acts as a fluid conduit to direct the heated seal air to the sealing surfaces.

The heat exchanger 112 is preferably positioned in the outlet plenum 47 so that the atmosphere surrounding the heat exchanger 112 is hot exhaust air. In this way, the seal air is heated by conduction and no supplemental heat source is necessary to heat the seal air. The temperature of the hot exhaust air is high enough so that the heat exchanger 112 is heated to a temperature sufficient to heat the cold seal air as it flows through the heat exchanger 112. The present invention thus captures this previously wasted heat (energy) and heats the seal air without taxing the system or requiring an additional energy source. This particular location for the heat exchanger 112 shown in FIGS. 8 and 9 at the front of the plenum 47 is a convenient location amenable to easy retrofitting of existing equipment, since communication with plenum 64 is readily accomplished simply by forming heat exchange inlet and outlet holes or slots 111 (sufficient to provide fluid communication between the plenum 64 and the heat exchange tubes) in the side walls of plenum 64 as shown in FIG. 12. This location of the heat exchanger 112 also does not result in interference with other oxidizer peripheries, such as an entrapment chamber. Alternatively, the heat exchanger 112 could be positioned about the inner perimeter of the plenum 47, around the flow distributor 50.

In an alternative embodiment, the heat exchanger could be eliminated, and an appropriate amount of hot exhaust air could be mixed directly with the seal air to raise its temperature. Alternatively, the heat exchanger could be used in combination with a portion of exhaust air recirculated to directly mix with the seal air to supplement the heating of the seal air.

Figure 13:
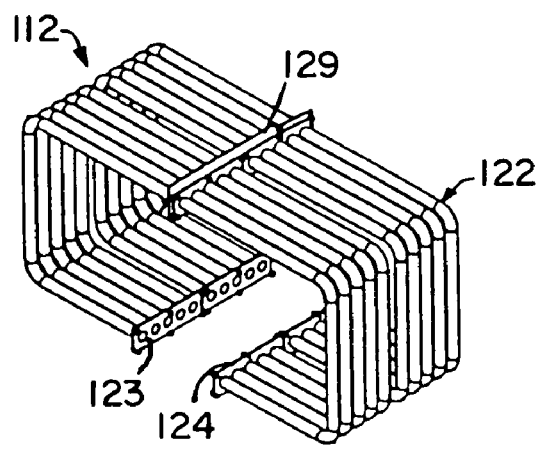
FIG. 13 is a perspective view of the heat exchanger in accordance with the present invention.

FIG. 13 shows a preferred embodiment of a heat exchanger 112 suitable for use in the present invention. A plurality of tubes 112 (ten shown) are assembled in a configuration conducive to placement in the exhaust plenum 64. The preferred configuration is substantially C-shaped as shown. The gap between the inlet end 123 of the heat exchanger 112 and outlet end 124 of the heat exchanger 112 is sufficient to accommodate the plenum 64. For ease of assembly, preferably the heat exchanger 112 is formed in two equal parts, held together after assembly by center support flange 129. A 40-50% efficient heat exchanger has been found to be sufficient to heat the seal air to a suitable temperature.

FIG. 14 illustrates how the plenum 64 feeding the shaft 52 with pressurized air is sealed against the drive shaft 52. Only one piston ring need by used for each seal above and below the plenum 64. Using the seal above the plenum 64 as exemplary, a C-shaped inner ring seal 216 is formed by boring a central groove therein. A stationary annular cylindrical wall 210 that functions as an outer ring seal includes an outer annular flange 211 used to center the wall 210 and clamp it to the plenum 64. A stationary piston ring 212 sits in the groove formed in the C-shaped inner ring seal 216 and biases against the wall 210. The gap between the piston ring 212 and the bore of the C-shaped inner seal 216, as well as the gap between the C-shaped inner seal 216 and the outer cylindrical wall 210, accommodates any movement of the drive shaft 52 due to thermal expansion or the like. A similar cylindrical wall 310, C-shaped inner seal 316 and piston ring 312 is used on the opposite side of the plenum 64 as shown in FIG. 14.

In operation, in a first mode, untreated ("dirty") process gas flows into inlet 48, through passageway 61 of the flow distributor 50, and into which ever respective valve ports 25 that are in open communication with the passageway 61 in this mode. The untreated process gas then flows up through the hot heat exchange media supported by cold face plenum 20 and through the combustion zone where it is treated, and the now clean gas is then cooled as it flows down through the cold heat exchange media in a second column, through the valve ports 25 in communication with passageway 60, and out through plenum 47 and outlet 49. Once the cold heat exchange media becomes relatively hot and the hot heat exchange media becomes relatively cold, the cycle is reversed by activating the drive mechanism to rotate drive shaft 52 and flow distributor 50. In this second mode, untreated process gas again flows into inlet 48, through passageway 61 of the flow distributor 50, which passageway is now in communication with different valve ports 25 that were previously only in fluid communication with passageway 60, thus directing the untreated process gas to the now hot heat exchange column and then through the combustion zone where the process gas is treated. The cleaned gas is then cooled as it flows down through the now cold heat exchange media in the other column, through the valve ports 25 now in communication with passageway 60, and out through plenum 47 and outlet 49. This cycle repeats itself as needed, typically every 1-4 minutes. The hot exhaust gas in plenum 47 surrounds the heat exchanger 112 and transfers some of its heat thereto, thereby heating the seal air circulating in the heat exchanger 112.

Figure 16:
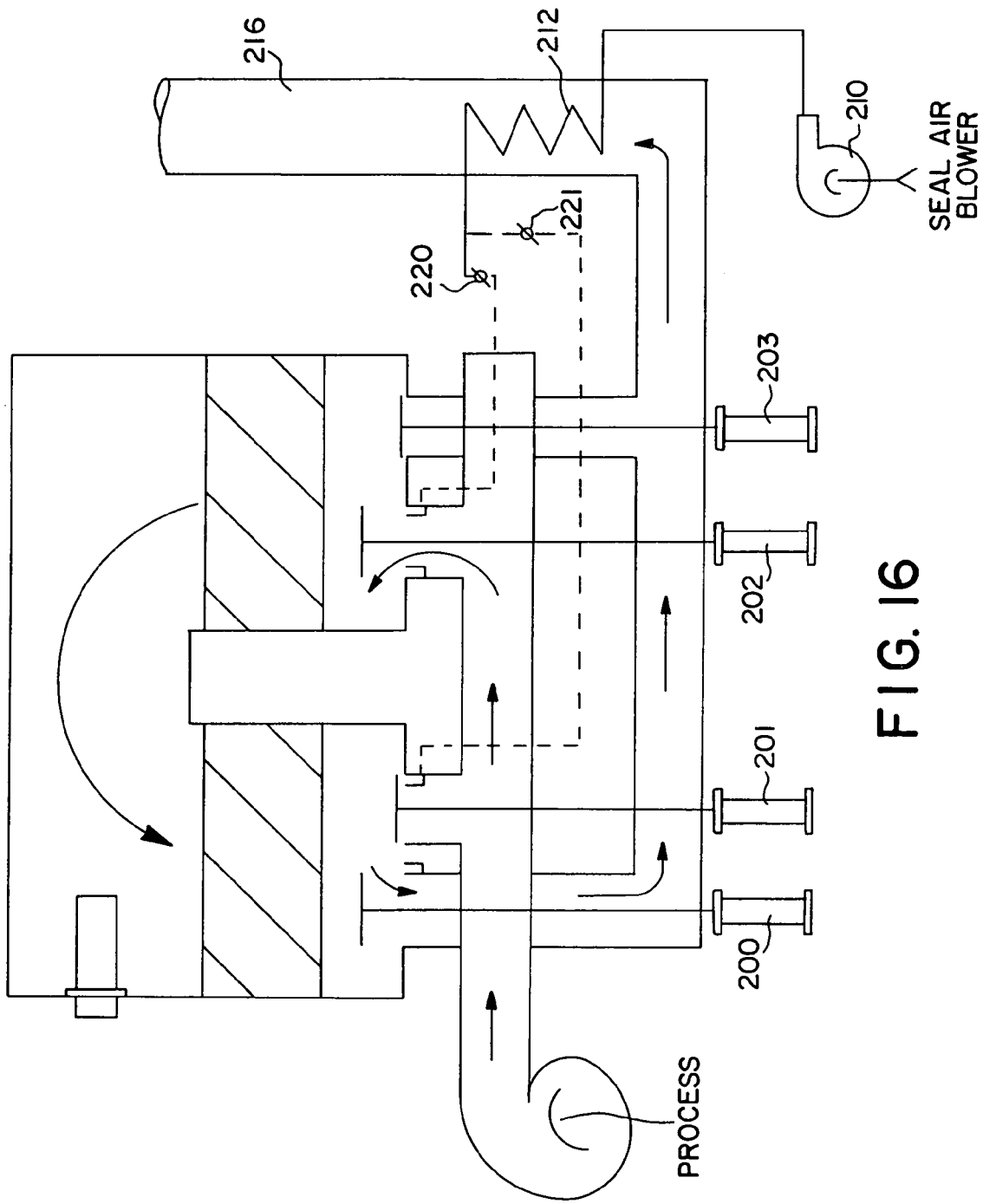
FIG. 16 is a schematic view of a regenerative thermal oxidizer using poppet valves with heated seal air in accordance with an embodiment of the present invention.

As stated above, the present invention is applicable to other types of valve systems, including poppet valves and butterfly valves. The important components are the valve, a blower or other device to deliver sealing gas, a heat exchanger in the hot exhaust stream, and a conduit from the heat exchanger to the sealing surface(s). For example, in a two bed regenerative thermal oxidizer utilizing four poppet valves 200, 201, 202 and 203 as shown in FIG. 16, only the two valves at the column inlets require heated seal air, since the two outlet valves are already warm and condensation generally is not problematic. A seal air blower 210 feeds seal air through heat exchanger 212 positioned in the exhaust stream, such as in the exhaust stack 216. The outlet of the heat exchanger 212 is in fluid communication with the sealing surfaces of the valve through suitable delivery conduits. On/off valves 220, 221 are positioned in each respective conduit to stop sealing air flow to a respective poppet valve when the poppet valve is in the open position, and to allow for flow when the poppet valve is in the closed, sealed position.

Figure 17:
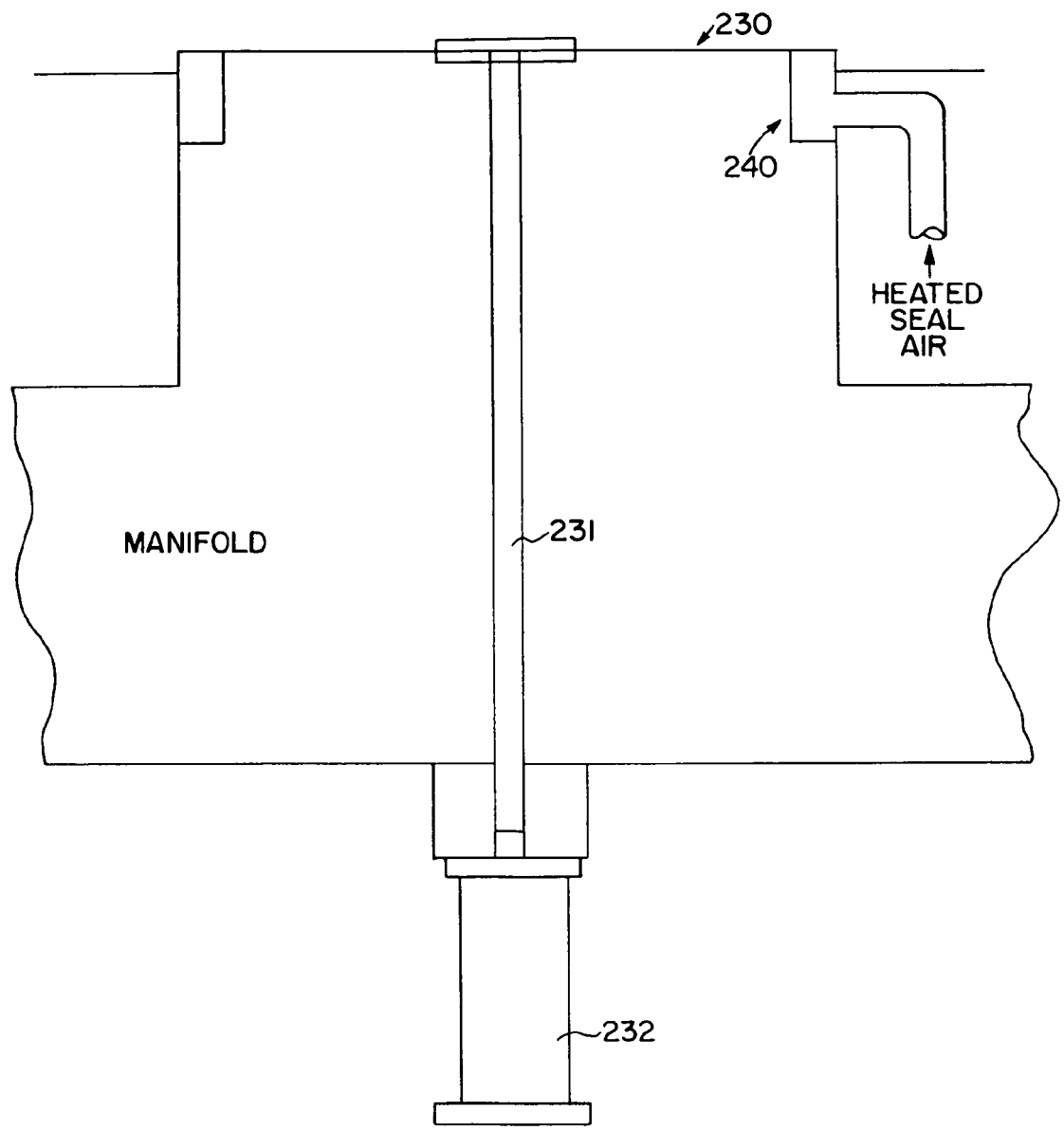
FIG. 17 is a schematic view of the annular sealing interface for a poppet valve in accordance with an embodiment of the present invention

As best seen in FIG. 17, the poppet disk 230 of the poppet valve is coupled to a shaft 231 that retracts and extends the valve using cylinder 232. An annular plenum 240 with two seats is in fluid communication with the heated seal air as shown. When the valve is in the closed position, the heated seal air flows into the plenum and creates an effective seal.

Figure 19:
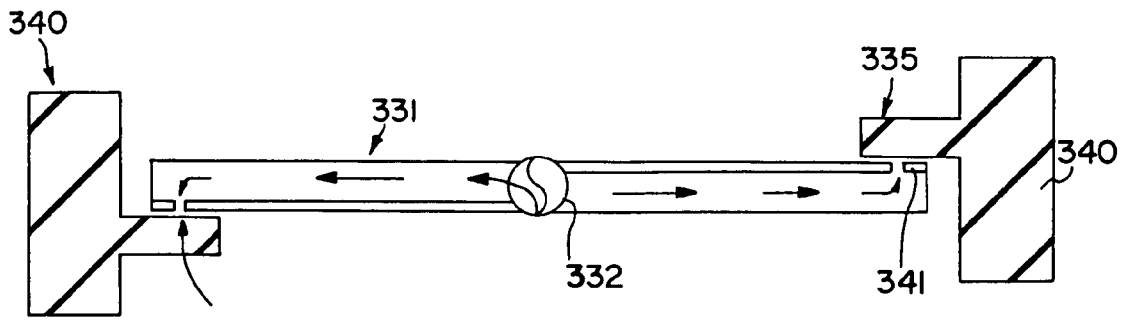
FIG. 19 is a sectional view of a butterfly valve utilizing heated seal air in accordance with an embodiment of the present invention.
Figure 20:
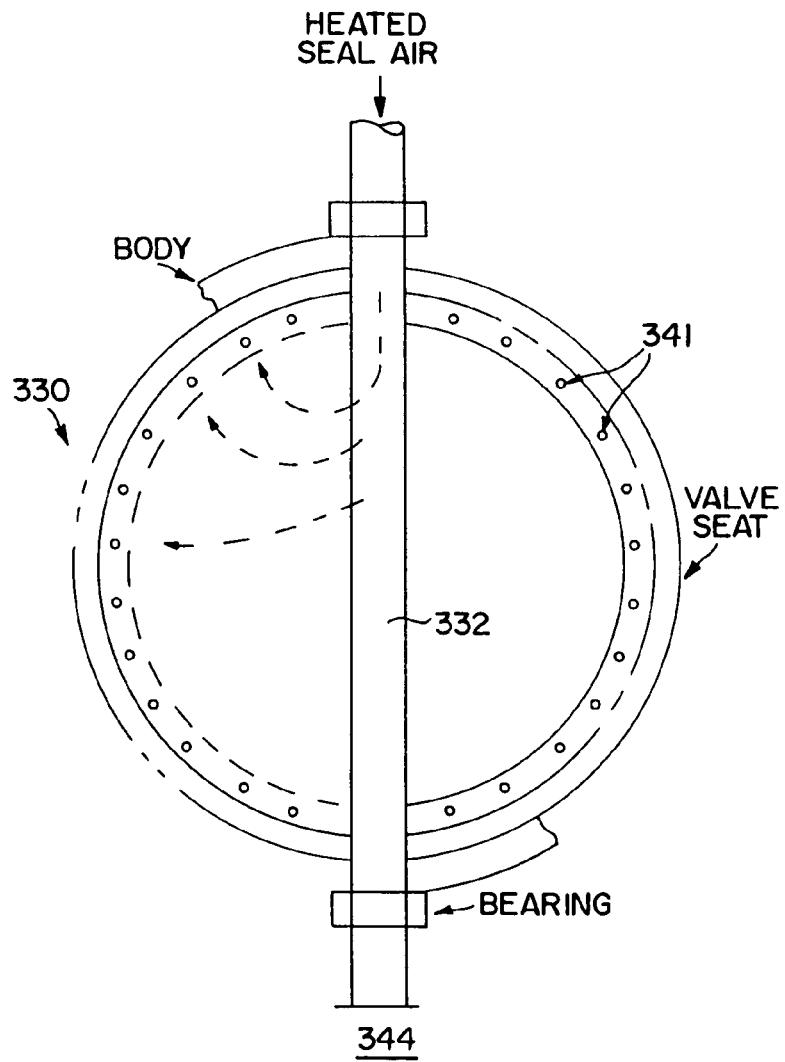
FIG. 20 is a top view of the butterfly valve of FIG. 19.

Similarly, FIGS. 19 and 20 illustrate application of the present invention to butterfly valve 330. A cavity of a hollow blade 331 is in fluid communication with hollow shaft 332 that is coupled to a rotary actuator 344 for rotating the blade 331 into and out of sealing relationship with the valve seat 335 of valve housing 340. The shaft 332 is also in fluid communication with a source of heated seal air. The blade 331 includes a plurality of seal ports 341 about its periphery that align with valve seat 335 to create the sealed interface when the valve is in the closed position. Heated seal air flows from the shaft 332, into the blade 331, out the seal ports 341 and against the valve seat 335.

What is claimed is:

1. A valve assembly, comprising: a source of sealing gas; a source of hot gas having a temperature higher than the temperature of said sealing gas; a heat exchanger having an inlet and an outlet, said inlet being in fluid communication with said source of sealing gas such that said sealing gas enters said inlet, flows through said heat exchanger and exits said outlet, said sealing gas being heated while flowing through said heat exchanger, said heat exchanger being heated by said hot gas; a valve including at least one sealing interface; and a delivery conduit in fluid communication with said outlet of said heat exchanger and with said at least one sealing interface to deliver said heated sealing gas to said interface.

2. The valve assembly of claim 1, wherein said sealing gas is air.

3. The valve assembly of claim 1, wherein said sealing gas is heated to a temperature of from about 150° F. to about 250° F. in said heat exchanger.

4. The valve assembly of claim 1, wherein said valve is a poppet valve.

5. The valve assembly of claim 4, further comprising at least one delivery conduit valve for controlling the flow of sealing gas to said sealing interface based upon the position of said poppet valve.

6. The valve assembly of claim 1, wherein said valve is a butterfly valve.

7. The valve assembly of claim 1, wherein said valve comprises: a flow distributor having a first passageway adapted to be in fluid communication with a gas inlet and a second passageway adapted to be in fluid communication with a gas outlet, said gas outlet comprising a gas outlet compartment containing said hot gas; wherein said heat exchanger is positioned in said gas outlet compartment so as to be heated by said hot gas, and wherein said sealing gas flows through said heated heat exchanger prior to entering said delivery conduit.

8. The valve assembly of claim 7, wherein said delivery conduit comprises a hollow shaft coupled to said flow distributor.

9. The valve assembly of claim 7, wherein said sealing gas is air.

10. The valve assembly of claim 7, further comprising a sealing gas plenum in fluid communication with said source of sealing gas, and wherein said sealing gas plenum is divided into a first inlet section in fluid communication with said heat exchanger inlet and a second section in fluid communication with said heat exchanger outlet, and wherein said second section is in fluid communication with said delivery conduit.

11. The valve assembly of claim 10, wherein said sealing gas plenum is divided by a baffle.

12. The valve assembly of claim 7, wherein said sealing gas is heated to a temperature of from about 150° F. to about 250° F. in said heat exchanger.

13. The valve assembly of claim 1, wherein said heat exchanger comprises a plurality of tubes.

* * * * *